United States Patent [19]

Stock et al.

[11] Patent Number: 4,736,503

[45] Date of Patent: Apr. 12, 1988

[54] CLUTCH SHOE CONSTRUCTION AND METHOD OF MAKING SAME

[75] Inventors: George W. Stock; David L. Heldt, both of Canton, Ohio

[73] Assignee: Dyneer Corporation, Westport, Conn.

[21] Appl. No.: 912,120

[22] Filed: Sep. 29, 1986

Related U.S. Application Data

[62] Division of Ser. No. 534,820, Sep. 22, 1983.

[51] Int. Cl.⁴ ............................................. B23Q 7/02
[52] U.S. Cl. ................................... 29/34 R; 29/525
[58] Field of Search .............................. 29/34 R, 525; 192/105 LF

[56] References Cited

U.S. PATENT DOCUMENTS 3,729,078  4/1973  Kincaid et al. ............... 192/105 CP
4,279,117  7/1981  Lawrence et al. ........ 192/105 CF X

*Primary Examiner*—Timothy V. Eley
*Attorney, Agent, or Firm*—Michael Sand Co.

[57] ABSTRACT

An improved clutch shoe of the type that is mounted on the rotor of a centrifugal clutch for coupling engagement with an outer clutch housing. The shoe is formed by two similar L-shaped shoe half sections which are stamped of sheet metal. Each shoe half section has an arcuate-shaped configuration comprising a web and an integral outer shoe table portion with an annular boss formed on each of the webs. A plurality of annular projections are formed on one of the shoe half webs and extend outwardly therefrom in a direction opposite from the annular boss formed on the web. The other shoe half web is formed with a plurality of holes into which the annular projections are press fitted to connect the two shoe halves together with the webs being placed in abutting relationship. The shoe half table portions lie in juxtaposition with respect to each other and form an outer shoe table on which a strip of friction material is attached. The annular bosses align with each other when the shoe half sections are connected and form a cylindrical sleeve into which a mounting bushing is press fitted. The method of stamping the shoe half sections, projections and bosses from sheet metal followed by the step of press fitting the projections into the complementary-shaped holes, followed by the press fitting of a mounting bushing into the aligned annular bosses eliminates any welding, brazing, riveting or similar procedures heretofore required for connecting the shoe components.

5 Claims, 3 Drawing Sheets

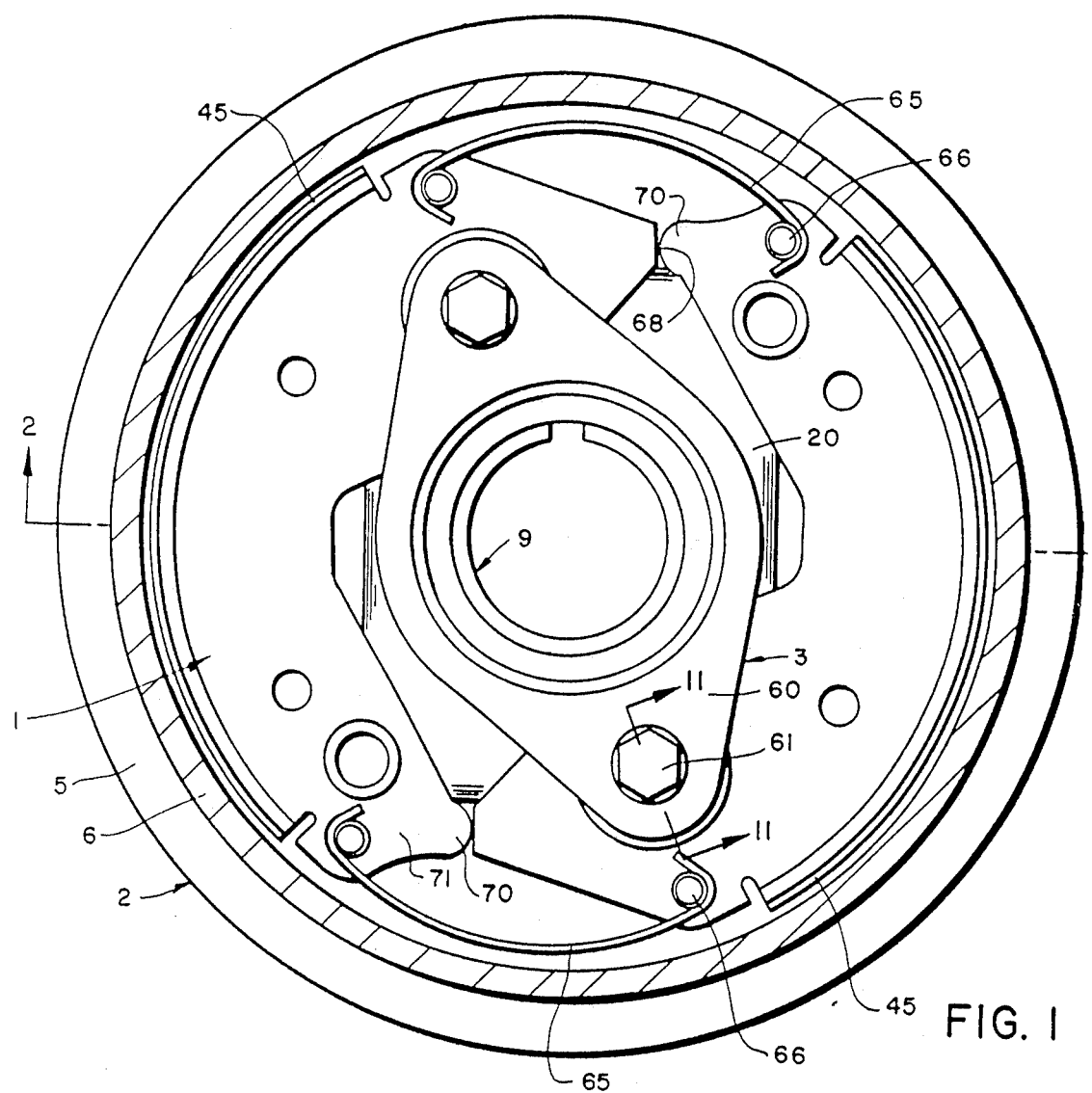
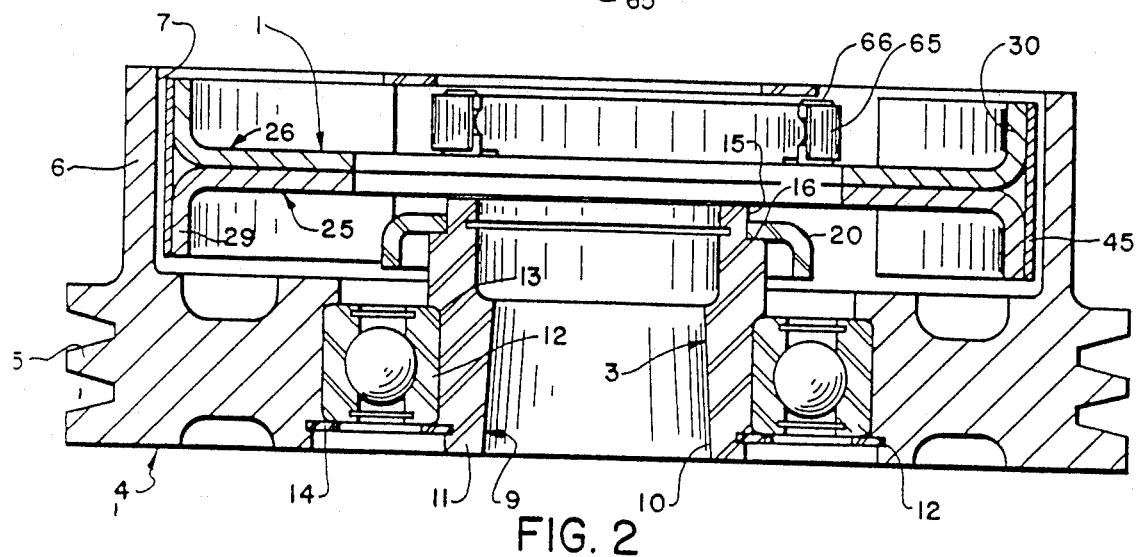

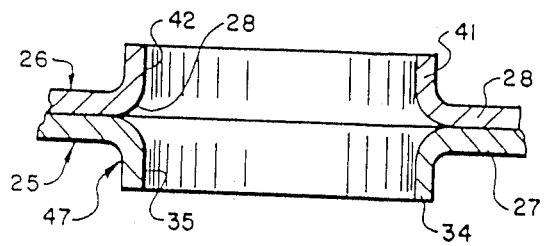 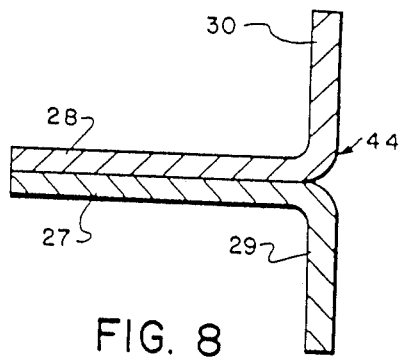
FIG. 7  FIG. 8
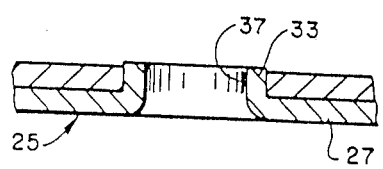 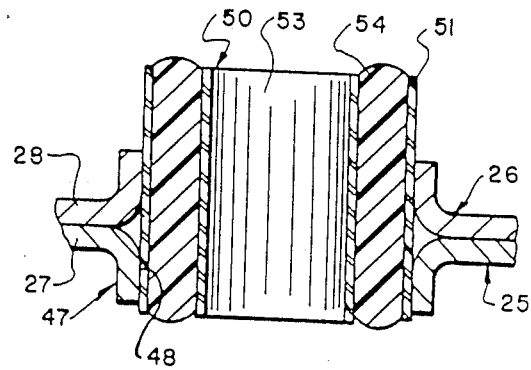
FIG. 9  FIG. 10
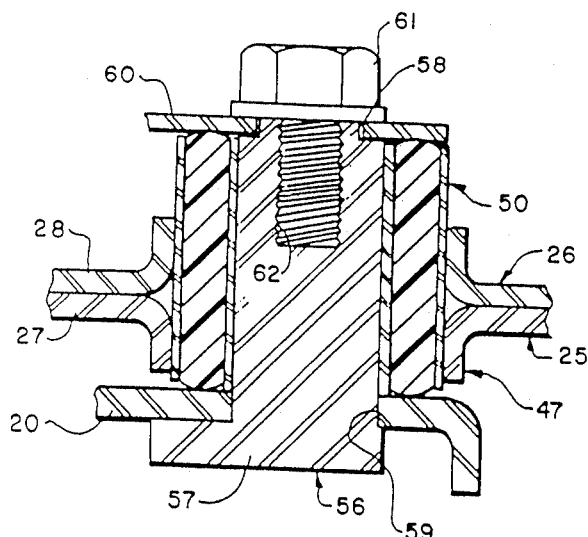 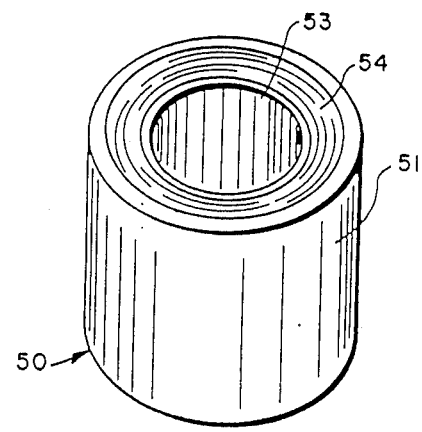
FIG. 11  FIG. 12

CLUTCH SHOE CONSTRUCTION AND METHOD OF MAKING SAME

CROSS REFERENCE

This application is a divisional application of Ser. No. 534,820, filed Sept. 22, 1983.

TECHNICAL FIELD

The invention relates to a centrifugal clutch of the type having a pair of pivotally mounted clutch shoes which swing outwardly into coupling engagement with a driven clutch member automatically by centrifugal force. More particularly the invention relates to an improved clutch shoe construction and the method of making it which has a reduced number of components and manufacturing operations than heretofore required in forming a similar type of clutch shoe.

BACKGROUND ART

There are numerous types and arrangements of centrifugal clutch constructions in which one or more clutch shoes are retained in retracted position by springs until sufficient centrifugal force acts on the shoes to overcome the force of retaining springs, whereupon the clutch shoes pivot and swing outwardly and engage a stationary clutch housing or drum.

Many of these clutch constructions have a pair of arcuate-shaped clutch shoes which are pivotally mounted on a clutch backing plate or rotor and which are arranged in an end-to-end relationship with respect to each other. The backing plate usually is fixed to a drive shaft or hub for rotation with the drive shaft. These clutch shoes have various spring arrangements which bias the shoes toward and retain the shoes in retracted position. It is this spring retaining tension which is overcome by the centrifugal force enabling the clutch shoes to engage the driven member.

These clutch shoes have a variety of configurations and constructions. Each shoe generally has an arcuate-shaped member formed of stamped steel and consists of a flat shoe web with an outer curved shoe table on which a strip of friction material is mounted for frictionally engaging a driven drum. In order to reduce the cost of these clutch shoes, fewer component parts and steps of assembly is desired without sacrificing reliability and efficiency.

Many types of existing clutch shoes are formed by a pair of similar, stamped steel flat members which are welded or riveted together to form the shoe web. An arcuate strip then is welded to the outer edge of the formed web to provide the shoe table on which the friction strip is attached. These clutch shoes are pivotally mounted on the clutch backing plate by a pin or bushing which is telescopically mounted in a sleeve which is welded or brazed in an opening formed in the shoe web.

This construction and method of assembly requires at least four separate parts, namely, a pair of matching shoe webs, an outer shoe table, and a bushing mounting sleeve. Likewise, several welding, brazing and/or riveting operations are required for assembling these four components. Each of these separate components and the manufacturing and assembling thereof increases the cost of the final clutch shoe construction.

There is no known existing clutch shoe construction and method of making of which we are aware, that enables the clutch shoe to be formed by a pair of stamped steel members which are joined without welding or brazing operations, and which eliminates the use of a bushing mounting sleeve.

DISCLOSURE OF INVENTION

Objectives of the invention include providing an improved clutch shoe construction for use in a centrifugal clutch in which the shoe is formed of two complementary-shaped, stamped steel members which are joined together without riveting, brazing or other similar attachment means; and in which each member has an arcuate, generally L-shaped configuration, one portion of which is the shoe web and the other portion being the shoe table. Another objective is to provide such a clutch shoe in which one of the members is formed with a plurality of outwardly extending projections which are press fitted into complementary-shaped holes formed in the other member for joining the members together to form the clutch shoe; in which each of the shoe table portions of the L-shaped member lies in juxtaposition to each other to form the complete arcuate-shaped shoe table; and in which each of the clutch shoes is formed with an annular outwardly projecting boss which align with each other when the shoes are joined to form a cylindrical sleeve for receiving a mounting bushing therein.

Another objective of the improved clutch shoe construction is the press fitting of the clutch shoe mounting bushing in the sleeve formed by the aligned annular bosses eliminating welding or brazing of the sleeve in the shoe web as heretofore required. Another objective is to provide such a construction which requires only two L-shaped stamped steel components for forming the shoe, yet which enables an extremely durable and rugged shoe to be formed with a minimum of manufacturing procedures, and in which the shoe can be mounted in existing clutch constructions using the heretofore clutch shoe which was assembled from four or more separate parts and which had to be welded or brazed to assemble the same.

Another objective of the invention is to provide an improved method for producing the clutch shoe which reduces the number of manufacturing operations heretofore required, and which eliminates welding, brazing and riveting operations without sacrificing reliability of the finished clutch shoe. A further objection is to provide such an improved method in which two L-shaped metal members are stamped from sheet steel with a plurality of annular projections being formed in one of the members followed by the step of press fitting the projections into complementary-shaped holes formed in the other member to join the members into an assembled shoe; and in which the improved method further includes stamping annular bosses into the half shoe members, which bosses surround openings; followed by the step of press fitting a mounting bushing in the annular bosses after the half shoe members are joined by the press fit engagement of the projections in the mating holes.

A further objective of the invention is to provide such a clutch shoe construction which is of an extremely simple arrangement, easy to manufacture and assembly, sturdy and durable in use, which eliminates difficulties heretofore encountered with other known clutch shoe constructions, which achieves the objectives indicated and solves problems, and which satisfies needs existing in the art.

These objectives and advantages are obtained by the improved centrifugal clutch shoe construction of the invention, the general nature of which may be stated as including first and second arcuate-shaped shoe halves, each having a web and an integral outer shoe table portion extending outwardly from said web; projection means formed on the web of one of the shoe halves and secured in complementary-shaped hole means formed in the web of the other shoe half for joining the webs in abutting relationship; annular boss means formed on each of the webs for forming a cylindrical sleeve extending outwardly from said abutting webs; and bushing means telescopically mounted in the cylindrical sleeve for mounting the shoe construction on a backing plate.

These objectives and advantages are further obtained by the improved method of producing such a shoe construction, the general nature of which may be stated as including the steps of stamping first and second arcuate-shaped shoe halves, each having a generally L-shaped cross-sectional configuration with a web and an integral outer shoe table portion; forming a projection in the web of the first shoe half which extends outwardly from the web in a direction opposite of the shoe table portion; forming a hole in the web of the second shoe half complementary to the projection formed in the web of the first shoe half; forming an annular boss and an interior opening surrounded by said boss in each of the webs, said bosses projecting outwardly from the webs in the same direction as the respective shoe table portion of the web; securing the projection formed in the web of the second shoe half to connect said shoe half webs in abutting relationship, with the bosses of said shoe half webs aligning with each other to form a cylindrical sleeve extending outwardly from said connected webs; and securing a mounting bushing in the cylindrical sleeve formed by the aligned bosses.

BRIEF DESCRIPTION OF THE DRAWINGS

A preferred embodiment of the invention, illustrative of the best mode in which applicants have contemplated applying the principles, is set forth in the following description and shown in the drawings, and is particularly and distinctly pointed out and set forth in the appended claims.

FIG. 1 is a front elevational view of a centrifugal clutch shown in retracted position within a clutch housing which is shown in section, with the improved clutch shoe incorporated therein;

FIG. 2 is a sectional view taken on line 2—2, FIG. 1;

FIG. 7 is an enlarged fragmentary sectional view taken on line 7—7, FIG. 3;

FIG. 8 is an enlarged sectional view taken on line 8—8, FIG. 3;

FIG. 9 is an enlarged fragmentary sectional view taken on line 9—9, FIG. 3;

FIG. 10 is a fragmentary sectional view similar to FIG. 7 showing the clutch shoe mounting bushing press fitted into the cylindrical sleeve formed by the joined half-shoe components;

FIG. 11 is an enlarged fragmentary sectional view similar taken on line 11—11, FIG. 1; and FIG. 12 is a perspective view of the clutch shoe mounting bushing.

BEST MODE FOR CARRYING OUT THE INVENTION

Figure 4:
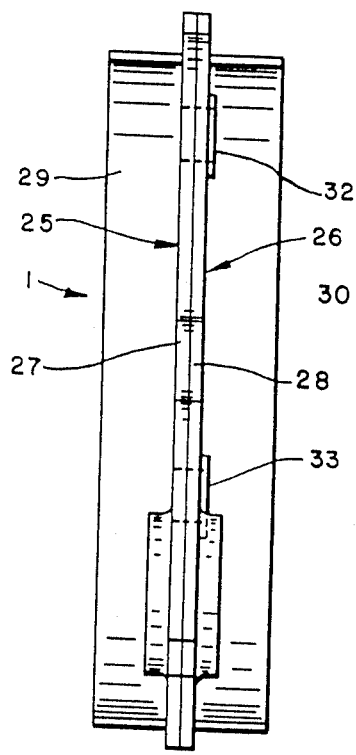
FIG. 4 is an end elevational view looking in the direction of arrows 4—4, FIG. 3.

The improved clutch shoe construction is indicated generally at 1, and is shown in FIG. 1 mounted in a clutch indicated generally at 2. Clutch 2 is intended to be driven in a usual manner by power shaft (not shown). Clutch 2 includes a rotor assembly 3 and a driven clutch member or housing 4.

Housing 4 is shown as an integral pulley clutch housing having a multi-V-grooved pulley end formation 5 which is connected to a cylindrical housing drum wall 6 (FIG. 2). The inner surface 7 of drum wall 6 provides a coupling surface for drivingly connecting clutch housing 4 with rotor assembly 3. Housing 4 may have various configurations and arrangements and may be adapted to be operatively engaged with mechanisms other than a multi-V-grooved pulley belt without affecting the concept of the present invention.

Rotor assembly 3 (FIGS. 1 and 2) includes a hub 9 which is adapted to be mounted on and secured to a drive shaft by a key-keyway arrangement or other attachment means so as to rotate with the drive shaft. Hub 9 has a smooth cylindrical inner bore 10 in which the drive shaft is telescopically inserted. Hub 9 further includes a reduced end 11 which is provided with a cylindrical outer surface on which driven clutch housing 4 is rotatably mounted by a bearing ring 12. Bearing ring 12 is located between an inner annular shoulder 13 formed on hub 9 and a snap ring 14 which maintains bearing ring 12 in position against shoulder 13.

The other end of hub 9 is provided with a cylindrical outer surface 15 which terminates in an inner annular shoulder 16, which extends radially with respect to the central axis of rotor assembly 3. A rectangular backing or drive plate 20 is mounted on the outer end of hub 9 and secured against shoulder 16 by welding or other attachment means. The above-described clutch rotor assembly and construction is by way of example and may vary without affecting the concept of the improved clutch shoe construction.

Figure 5:
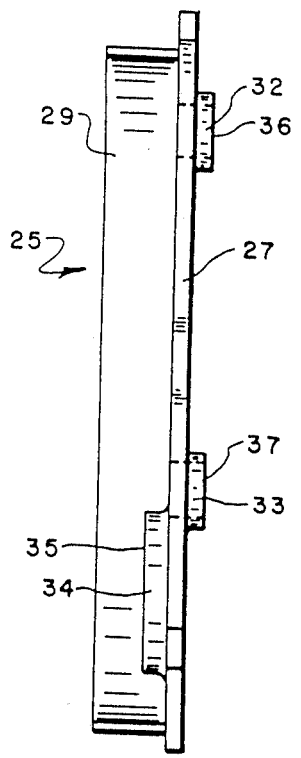
FIGS. 5 and 6 are end elevational views of the two half-shoe components which form the improved clutch shoe.
Figure 6:
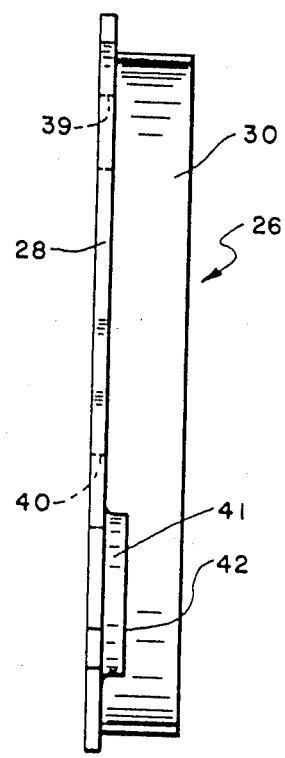

Improved clutch shoe 1 (FIGS. 3 and 4) includes two arcuate-shaped shoe halves, indicated generally at 25 and 26, as shown in FIGS. 5 and 6, respectively. Each clutch shoe half is generally L-shaped in cross section having arcuate-shaped webs 27 and 28, terminating in integral shoe table portions 29 and 30, respectively. Shoe table portions 29 and 30 extend outwardly at right angles with respect to webs 27 and 28.

Web 27 of shoe half 25 is formed with a pair of spaced annular-shaped projections 32 and 33 which extend outwardly from web 27 in a direction opposite to shoe table 29. An annular boss 34 also is formed on shoe web 27 and projects outwardly therefrom in the same direction as shoe table portion 29 and opposite of annular projections 32 and 33. Projections 32 and 33 preferably are equal in diameter to each other and have a smaller diameter than boss 34. Boss 34 is stamped from web 27 and the material displaced to form boss 34 provides a cylindrical opening 35 within the periphery of boss 34 (FIG. 7). Likewise, the formation of projections 32 and 33 in web 27 forms holes 36 and 37 within the periphery of projections 32 and 33, respectively.

Shoe half 26 is complementary in shape and size to shoe half 25 and is formed with a pair of circular holes 39 and 40 complementary to the outer diameter of annular projections 32 and 33, respectively. An annular boss 41 also is formed on web 28 of shoe half 26 and projects outwardly therefrom in the same direction as shoe table 30. Boss 41 is complementary in shape and size with boss 34 of shoe half 25 and surrounds a cylindrical opening 42 equal in size to opening 35.

Figure 3:
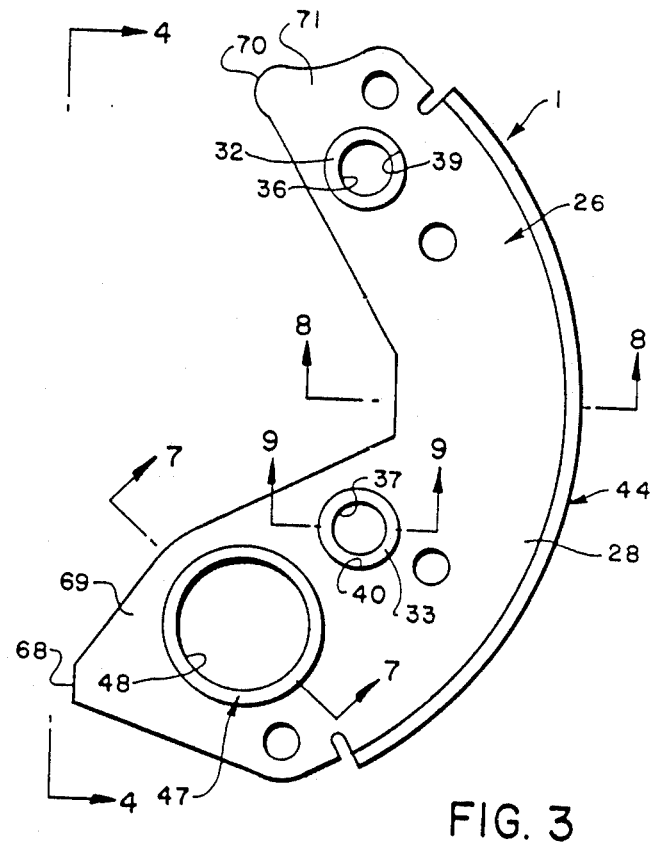
FIG. 3 is an elevational view of the improved clutch shoe construction removed from the clutch of FIGS. 1 and 2.

In accordance with another feature of the invention, shoe halves 25 and 26 are assembled by placing shoe webs 27 and 28 in abutment with projections 32 and 33 being press fitted into holes 39 and 40, respectively (FIGS. 3 and 4). This press fit firmly joins the two shoe halves together to provide a laminated clutch shoe without requiring any brazing, welding or riveting operation as heretofore required in prior laminated clutch shoe constructions. Shoe table portions 29 and 30 are located in juxtaposition and form a single shoe table indicated generally at 44, to which is attached a strip 45 of friction material which is shown in FIGS. 1 and 2.

When shoe half webs 27 and 28 are joined in abutting relationship, bosses 34 and 41 and cylindrical openings 35 and 42 thereof, align with each other as shown in FIG. 7. Bosses 34 and 41 extend outwardly in opposite directions with respect to each other and form a cylindrical sleeve 47 having a cylindrical opening 48 extending therethrough.

In accordance with another feature of the invention, a mounting bushing indicated generally at 50 (FIG. 12), is telescopically mounted within cylindrical opening 48 of sleeve 47 by a press fit engagement with the walls of annular bosses 34 and 41 (FIG. 10). Mounting bushing 50 is of a usual construction and preferably includes an outer cylindrical sleeve 51, an inner concentric sleeve 53 and an elastomer annulus 54 which is mounted in compression between sleeves 51 and 53. This press fit engagement of bushing 50 in sleeve 47 eliminates the welding or brazing of a separate bushing sleeve in a circular opening formed in the shoe web heretofore required in prior shoe constructions.

Bushing 50 enables improved clutch shoe 1 to be pivotally mounted on drive flange 20 in a usual manner as shown in FIG. 11. A pin 56 having a cylindrical shank 57 which terminates at one end in a reduced diameter circular head 58, is inserted through a complementary-shaped hole 59 formed in drive flange 20. The outer diameter of pin 56 is complementary to the inner diameter of bushing sleeve 53 and provides a sliding, pivotal connection therebetween. A bridge 60 having a generally elongated oval-shaped configuration (FIG. 1) is mounted on the top of pin 56 by a cap screw 61 which is engaged in a threaded hole 62 formed in pin shank 57.

For most clutch constructions, a pair of clutch shoes 1 are mounted on drive flange 20 as shown in FIGS. 1 and 2, and are arranged in an end-to-end relationship and are retained in retracted position by a curved strip of spring steel 65. Spring 65 is mounted on and extends between adjacent shoe ends as shown in FIGS. 1 and 2 by spring pins 66. Each clutch shoe preferably is formed with a flat surface 68 at pivotal end 69 thereof which is engaged by a rounded projection 70 formed on swinging end 71 of the clutch shoes. The engagement of edge projection 70 against flat surfaces 68 of the adjacent shoes serves as a stop for the shoes when they are in retracted position. This eliminates the use of separate stop members as required in prior clutch constructions to limit the inward movement of the shoe by the biasing effect of springs 65.

In addition to the improved construction of clutch shoe 1, the method of forming the same reduces manufacturing costs by eliminating certain manufacturing operations heretofore required in forming prior clutch shoes. The improved method of the invention includes the steps of stamping shoe halves 25 and 26 in a metal stamping operation. Each shoe half preferably is formed from a flat strip of metal with shoe table portions 29 and 30 being bent at right angles with respect to the remaining arcuate webs 27 and 28 resulting in the generally L-shaped cross-sectional configuration shown in FIGS. 5, 6 and 8. Bosses 34 and 41, annular projections 32 and 33, and holes 39 and 40 also are formed in webs 27 and 28 by metal stamping procedures, generally simultaneously with or in a separate stamping operation when the forming of the webs and of shoe table portions.

All of above described steps can be performed by known stamping and metal forming equipment in a single stamping operation or in a progressive die arrangement. Shoe halves 25 and 26 can be produced extremely inexpensively in mass quantities, and then are assembled easily by placing webs 27 and 28 in abutment with each other with bosses 32 and 33 extending through aligned complementary-shaped holes 39 and 40. Preferably projections 32 and 33 are press fit into holes 39 and 40 with a sufficiently tight engagement to securely attach the shoe halves together in the abutting relationship as shown in FIG. 4. However, it is easily seen that bosses 32 and 33 may have a looser fit in holes 39 and 40 with the ends thereof, being staked or upset against web 28 to secure the webs together without affecting the concept of the invention.

The next step of the improved method is the press fitting of bushing 50 in cylindrical sleeve 47 formed by the alignment of bosses 34 and 41 and openings 35 and 42 thereof. Heretofore, a separate metal sleeve had to be brazed in an opening formed in the shoe web to provide a sleeve for receiving a mounting bushing. This separate sleeve had to be secured by welding or brazing operations. This entire manufacturing operation has been eliminated by the stamping of bosses 34 and 41 on webs 27 and 28.

Thus, the improved method provides an extremely simple and inexpensive procedure for forming a clutch shoe with a minimum number of manufacturing operations thereby reducing the cost of producing the clutch shoe without sacrificing reliability and operating characteristics thereof. Furthermore, the improved clutch construction requires only two components for forming the clutch shoe in contrast to the heretofore four components for forming a nearly identical shoe construction. The elimination of even one component part of a shoe assembly reduces the cost of the finished product.

Although the above discussion pertains to centrifugal clutches and shoes therefor, it is easily seen that this same shoe construction and method of forming the same, will apply to brake shoes and their method of manufacture. The main difference between the two types of shoes is that the brake shoe moves outwardly into coupling engagement with another member by a hydraulic or mechanical force instead of under the influence of centrifugal force as in the clutch construction described above. Therefore, the invention need not be limited to clutch shoes but will apply to brake shoes and the manufacture thereof. Likewise, projections 32 and 33 are shown as annular members which are engageable in complementary-shaped circular holes 39 and 40. These projections and mating holes may be noncircular, if desired, without affecting the concept of the invention. Also, additional projections may be formed on the webs at different locations than that shown in the drawings for securing the shoe webs in rigid abutting relationship.

Accordingly, the improved clutch shoe construction is simplified, provides an effective safe, inexpensive and efficient device which achieves all the enumerated objectives, provides for eliminating difficulties encountered with prior devices and solves problems and obtains new results in the art. Likewise, the improved method provides an extremely simple and inexpensive manufacturing procedure for producing such clutch shoe construction by reducing the number and types of manufacturing operations heretofore required for producing clutch shoes.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved clutch shoe is constructed and used, the characteristics of the construction, and the advantageous, new and useful results obtained; the new and useful structure, devices, elements, arrangements, parts, and combinations, are set forth in the appended claims.

What is claimed is:

1. An improved method of producing a clutch shoe including the steps of:
    (a) stamping first and second arcuate-shaped shoe halves, each having a generally L-shaped cross-sectional configuration with a web and an integral outer shoe table portion extending outwardly in a first direction;
    (b) forming a projection in the web of the first shoe half which extends outwardly from the web in a second direction opposite to said first direction;
    (c) forming a hole in the web of the second shoe half complementary to the projection formed in the web of the first shoe half;
    (d) forming an annular boss and an interior opening surrounded by said boss in each of the webs, said bosses projecting outwardly from the webs in the said first direction;
    (e) securing the projection formed in the web of the second shoe half to connect said shoe half webs in abutting relationship, with the bosses of said shoe half webs aligning with each other to form a cylindrical sleeve extending outwardly from said connected webs; and
    (f) securing a mounting bushing in the cylindrical sleeve formed by the aligned bosses.

2. The method defined in claim 1 in which the projection and annular bosses are stamped in the shoe webs.

3. The method defined in claim 2 in which a pair of projections are stamped in the web of the first shoe half, said projections each having an annular shape.

4. The method defined in claim 3 in which holes are formed in the web of the first shoe web by displacing material in the web to form the annular projections, which projections surround said holes.

5. The method defined in claim 1 in which the projection is secured in the complementary-shaped hole by a press fit engagement; and in which the mounting bushing is secured in the cylindrical sleeve by a press fit engagement.

* * * * *